(12) United States Patent
Lawrence, III

(10) Patent No.: US 10,257,113 B2
(45) Date of Patent: *Apr. 9, 2019

(54) METHOD AND APPARATUS TO THROTTLE MEDIA ACCESS BY WEB CRAWLERS

(71) Applicant: The Nielsen Company (US), LLC, New York, NY (US)

(72) Inventor: Bradley R. Lawrence, III, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,173

(22) Filed: Feb. 5, 2018

(65) Prior Publication Data
US 2018/0167336 A1 Jun. 14, 2018

Related U.S. Application Data

(63) Continuation of application No. 14/530,659, filed on Oct. 31, 2014, now Pat. No. 9,887,933.

(51) Int. Cl.
*H04L 12/927* (2013.01)
*G06F 17/30* (2006.01)
*H04L 12/823* (2013.01)

(52) U.S. Cl.
CPC ........ *H04L 47/80* (2013.01); *G06F 17/30864* (2013.01); *H04L 47/32* (2013.01)

(58) Field of Classification Search
None
See application file for complete search history.

(56) References Cited

U.S. PATENT DOCUMENTS 6,662,230 B1 * 12/2003 Eichstaedt ............. G06F 21/62
709/217
6,832,239 B1 * 12/2004 Kraft ...................... H04L 67/06
709/203

(Continued)

FOREIGN PATENT DOCUMENTS

WO 2007061824 5/2007
WO 2011011066 1/2011

OTHER PUBLICATIONS

Arehart, Charlie, "How to Slow Down a Generic Bot?," Charlie Arehart's Blog, Sep. 28, 2011, retrieved from <http://webmasters.stackexchange.com/questions/20224/how-to-slow-down-a-generic-bot>, retrieved on Oct. 9, 2014 (1 page).

Arehart, Charlie, "Some code to throttle rapid requests to your CF server from one IP address," Charlie Arehart's Blog, May 21, 2010, retrieved from <http://www.carehart.org/blog/client/index.cfm/2010/5/21/throttling_by_ip_address>, retrieved on Oct. 9, 2014 (12 pages).

(Continued)

*Primary Examiner* — Thomas J Dailey

(74) *Attorney, Agent, or Firm* — Hanley, Flight & Zimmerman, LLC

(57) ABSTRACT

Methods, apparatus, systems and articles of manufacture are disclosed to throttle resource access by web crawlers. An example apparatus disclosed herein includes a data interface to obtain a media request message for media hosted by a server, the media request message requesting access to the media. The example apparatus also includes a category handler to determine a source indicator of a media-requesting source associated with the media request message, the source indicator indicating whether the media-requesting source is associated with a media provider to provide audience measurement information associated with the media provided by the media provider. The example apparatus also includes a penalty manager to insert a time delay including a delay tag in the media response message to the media-requesting source based on the source indicator, the delay tag to cause a delay time period based on the source (Continued)

indicator, at least one of the data interface, category handler, and penalty manager is implemented on a logic circuit.

20 Claims, 10 Drawing Sheets

(56) References Cited

U.S. PATENT DOCUMENTS

| | | | | |
|---|---|---|---|---|
| 7,483,910 | B2* | 1/2009 | Beyer | G06F 17/30864 |
| 7,599,920 | B1* | 10/2009 | Fox | G06F 17/30864 |
| 7,647,609 | B2* | 1/2010 | Wachtfogel | H04N 5/76 |
| | | | | 725/135 |
| 7,774,782 | B1* | 8/2010 | Popescu | G06F 9/505 |
| | | | | 709/202 |
| 8,078,483 | B1* | 12/2011 | Hirose | G06Q 10/02 |
| | | | | 705/1.1 |
| 8,463,627 | B1* | 6/2013 | Hirose | G06Q 10/02 |
| | | | | 705/5 |
| 8,463,630 | B2* | 6/2013 | Hirose | G06Q 10/02 |
| | | | | 705/5 |
| 8,533,011 | B2* | 9/2013 | Hirose | G06Q 10/02 |
| | | | | 705/1.1 |
| 8,595,847 | B2* | 11/2013 | Petta | G06F 17/30864 |
| | | | | 709/229 |
| 8,762,705 | B2* | 6/2014 | He | H04L 63/0428 |
| | | | | 713/150 |
| 2012/0259833 | A1* | 10/2012 | Paduroiu | G06F 17/30864 |
| | | | | 707/709 |
| 2016/0127262 | A1 | 5/2016 | Lawrence, III | |

OTHER PUBLICATIONS

Lozier, Dave, "Rate Limiting With Nginx—Slow Down Website Scans," davelozier.com, Jun. 7, 2014, retrieved from <http://davelozier.com/2014/06/07/rate-limiting-with-nginx-slow-down-website-scans/>, retrieved on Oct. 9, 2014 (3 pages).

Ruby Forum, "Forum: NGINX Slow down, but not stop, serving pages to bot that doesn't respect robots.txt delay," Ruby-Forum.com, Aug. 11, 2011, retrieved from <http://www.ruby-forum.com/topic/2335886>, retrieved on Oct. 9, 2014 (3 pages).

stackoverflow.com, "Should I use CFThread to slow down bot traffic?," retrieved from <http://stackoverflow.com/questions/24493464/should-i-use-cfthread-to-slow-down-bot-traffic>, retrieved on Oct. 9, 2014 (2 pages).

United States Patent and Trademark Office, "Non-Final Office Action," issued in connection with U.S. Appl. No. 14/530,659, dated Jul. 28, 2016 (15 pages).

United States Patent and Trademark Office, "Final Office Action," issued in connection with U.S. Appl. No. 14/530,659, dated Feb. 9, 2017 (10 pages).

United States Patent and Trademark Office, "Non-Final Office Action," issued in connection with U.S. Appl. No. 14/530,659, dated Jun. 2, 2017 (9 pages).

United States Patent and Trademark Office, "Notice of Allowance," issued in connection with U.S. Appl. No. 14/530,659, dated Sep. 27, 2017 (13 pages).

wikipedia.org, "Hashcash," Wikipedia, Sep. 10, 2014, retrieved from <http://en.wikipedia.org/w/index.php?title=Hashcash&printable=yes>, retrieved on Oct. 9, 2014 (6 pages).

* cited by examiner

| SOURCE CATEGORY | PENALTY THRESHOLD (NUMBER OF MEDIA REQUESTS) | DELAY (SECONDS) |
|---|---|---|
| PARTNER | LESS THAN 5 PER SECOND | 0 |
| PARTNER | 5 OR MORE PER SECOND | 1 |
| PARTNER | LESS THAN 100 (E.G., IN AN HOUR) | 0 |
| PARTNER | 100 OR MORE (E.G., IN AN HOUR) | 1 |
| NON-PARTNER | 100 OR LESS (E.G., IN AN HOUR) | 2 |
| NON-PARTNER | BETWEEN 100 AND 1000 (E.G., IN AN HOUR) | 4 |
| NON-PARTNER | 1000 OR MORE (E.G., IN AN HOUR) | 6 |
| UNKNOWN | LESS THAN 2 PER SECOND | 0.1 |
| UNKNOWN | 2 OR MORE PER SECOND | 6 |

FIG. 6

METHOD AND APPARATUS TO THROTTLE MEDIA ACCESS BY WEB CRAWLERS

RELATED APPLICATIONS

This patent arises from a continuation of U.S. patent application Ser. No. 14/530,659, filed on Oct. 31, 2014, titled "METHODS AND APPARATUS TO THROTTLE MEDIA ACCESS BY WEB CRAWLERS. The entirety of U.S. patent application Ser. No. 14/530,659 is incorporated herein by reference.

FIELD OF THE DISCLOSURE

This disclosure relates generally to media access, and, more particularly, to methods and apparatus to throttle media access by web crawlers.

BACKGROUND

Internet bots are software programs developed to run automated tasks on the Internet. Web crawlers are Internet bots to collect and/or catalog information across the Internet. Web crawlers may alternatively be developed for nefarious purposes. For example, spambots are Internet bots that crawl the Internet looking for email addresses to collect and to use for sending spam email. Sniperbots are Internet bots developed to purchase as many tickets as possible when tickets for a performance are made public, or to monitor auction websites and provide a winning bid as the bidding period ends for the auction item. Some Internet bots may be developed to disrupt networks and/or web servers by requesting media from the hosting server at a high frequency (e.g., via distributed denial-of-service (DDoS) attacks).

BRIEF DESCRIPTION OF THE DRAWINGS

FIG. 6 is an example data table that may be stored by the example throttling engine of FIGS. 1 and/or 2 for use during media access throttling.

DETAILED DESCRIPTION

Figure 1:
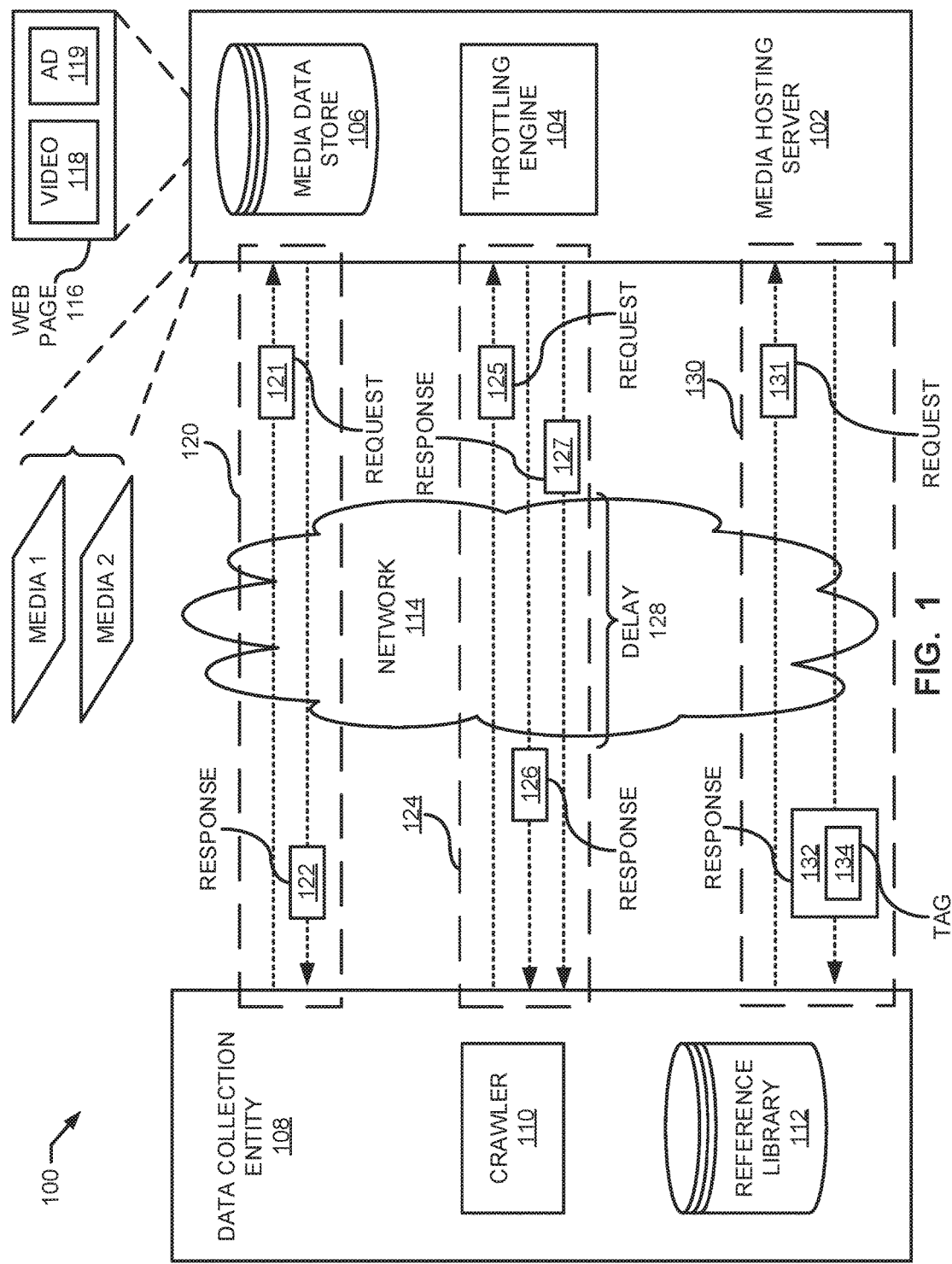
FIG. 1 is a block diagram of an example environment in which methods and apparatus throttle media access by web crawlers in accordance with the teachings of this disclosure.

Each time a media hosting server receives a media access request, network resources (e.g., bandwidth) are being used by the media hosting server. Generally, when humans are causing the media access requests to be sent to the media hosting server, bandwidth usage is not considered a problem for media hosting servers.

For example, consider a company called Business Entity that hosts a public website www.BusinessEntity.com on a website hosting server. A user who is, for example, collecting information about the company may use an Internet browser to browse through the company's websites. As the user loads new pages, the browser sends new media access requests for the pages to the website hosting server. The website hosting server processes the media access requests, identifies the requested media, retrieves and/or makes available the requested media, and then sends a response message to the browser including the requested media. The browser then processes the received media and renders or reconstructs the media to present to the user. In some instances, the person may revisit the website, resulting in additional media access requests made to the website hosting server. In some instances, a person may intentionally cause multiple, repeated media access requests made to the website hosting server. For example, a user following an item on sale at an electronic auction site may cause the browser to repeatedly refresh the screen for price or product availability updates. Each such refresh instruction results in new media access requests sent to and received by the website hosting server, thereby utilizing additional bandwidth and causing additional network traffic.

Because the amount of information on the Internet is growing, it is difficult for a user to keep track of new information loaded and/or updated on the Internet. A bot (e.g., an Internet bot) is a software application that runs automated tasks (e.g., over the Internet). A web crawler is an Internet bot developed to crawl networks (e.g., the Internet) to discover and collect (e.g., download) desired information. In some examples, the web crawler requests media (e.g., web pages) from the website hosting server, storing the media returned by the website hosting server, etc. In some examples, the web crawler (sometimes referred to as a "spider") may be embedded in a web browser to facilitate collecting dynamic media generated by client-side scripts (e.g., executable instructions processed by the browser).

A web crawler may be developed for one or more reasons. For example, a data collection entity such as an audience measurement entity or a search engine may develop a web crawler to collect and/or catalog media available across the Internet. For example, an audience measurement entity, such as The Nielsen Company (US), LLC, that monitors and/or reports the usage of advertisements and/or other types of media, may use a web crawler to develop a reference library of advertisements and/or other types of media to which a user may be exposed on the Internet. Search engines may develop web crawlers to locate available media and develop an index of the media to provide search term query results.

To make sure that the cataloged information is up-to-date (e.g., fresh information), data collection entities instruct their web crawlers to revisit and/or reload collected and/or cataloged media. Web crawlers may revisit and/or reload media at different frequencies. For example, in a one day time period, an entity's web crawler cataloging media on the Business Entity's network may request an employee's profile page once, and request a web page showing live sales numbers more than one hundred times.

In short, web crawlers may be utilized for many purposes. Whether a web crawler is developed for appropriate purposes or for malicious purposes, the high frequency with which the web crawler requests media from a media hosting server may put a strain on the network resources of the media hosting server. In some instances, the bandwidth used to process web crawler requests may interfere with access to the media hosting server by human users.

To combat the potential overuse (e.g., abuse) of network resources, some network administrators load a robot exclusion standard file (e.g., a robot.txt file) on their server(s). A robot exclusion standard file can operate as a blacklist and/or a whitelist for blocking and/or allowing access to resources hosted by the web server. This approach results in an "all-or-nothing" system in which a crawler either is completely blocked from accessing media, or is always allowed access to the media. However, the robot exclusion standard file is unable to decrease the number of media access requests received from web crawlers. Furthermore, compliance with the robot exclusion standard file is voluntary. That is, a crawler can elect whether to abide by the specifications in the robot exclusion standard file, or ignore the specifications. Thus, the robot exclusion standard file will not limit bots and/or crawlers designed with a malicious intent.

Other techniques such as blocking Internet protocol (IP) addresses or including tests to verify that a resource request is from a human (e.g., Completely Automated Public Turing test to tell Computers and Humans Apart (CAPTCHA)) also result in "all-or-nothing" means of controlling network resources. For example, a crawler is blocked from accessing media when, for example, a request for the media is received from a crawler having a blocked IP address, the crawler is unable to pass the CAPTCHA test, etc. A crawler is allowed to access the media when, for example, the crawler has an allowed IP address and/or an IP address not included in a blocked IP addresses list, the crawler uses a fake IP address, the crawler is able to pass the CAPTCHA test, etc.

Examples disclosed herein control network resources used by a web crawler by throttling the number of media requests the web crawler is able to execute during a time period. Examples disclosed herein introduce a delay time in a media access session, thereby extending the time required to complete the media access session and decreasing the number of media access sessions that the web crawler is able to execute. As used herein, a media access session is initiated when a web crawler transmits a media request message to a media hosting server, and the media access session is completed when the requested media is processed at the requesting device (e.g., the web crawler). Thus, during the media access session, the media hosting server receives and processes the media request message, retrieves the requested media and sends a media response message including the requested media to the web crawler. Also during the media access session, the web crawler processes the media response message.

In some disclosed examples, the media hosting server introduces a delay in the media access session at the server. For example, the media hosting server may "pause" or slow down transmission of the media response message. For example, the media hosting server (1) may pause for one second (or any other amount of time) before processing the media request message to identify the requested media, (2) may retrieve the requested media slowly by, for example, limiting the bandwidth available for retrieval and/or (3) may pause for one second (or any other amount of time) before sending the media response message to the web crawler. Causing the delay to occur server-side may be beneficial if, for example, the web crawler does not include resources to execute the delay tag and/or cannot be trusted to execute the delay tag (e.g., a malicious bot may ignore the delay tag). In some examples, introducing the delay server-side appears as normal network congestion to the web crawler.

In some examples disclosed herein, the media hosting server introduces a delay in the media access session by embedding a delay tag in the media response message that the web crawler executes (e.g., processes) before presenting the media. For example, the delay tag may include executable instructions (e.g., Java, JavaScript, or other executable instructions) that cause the web crawler to perform clock-cycle burning operations before the web crawler can present the requested media. Causing the delay to occur at the client-side may be beneficial to conserve processing power that would be utilized by the server if the delay were implemented at the media hosting server.

FIG. 1 is an illustration of an example environment 100 in which examples disclosed herein may be implemented to throttle media access. The example environment 100 of FIG. 1 includes an example media hosting server 102 and an example data collection entity 108. In the illustrated example, the media hosting server 102 includes a throttling engine 104. The example media hosting server 102 also hosts a media data store 106. In the illustrated example, the data collection entity 108 operates and/or hosts a crawler 110. In some examples, the media hosting server 102 and/or the crawler 110 are implemented using multiple devices. For example, the media hosting server 102 may include multiple server virtual machines, disk arrays and/or multiple workstations (e.g., desktop computers, workstation servers, laptops, smartphones, etc.) in communication with one another. Similarly, the crawler 110 (which is typically implemented by software executing as one or more programs) may be instantiated on multiple server virtual machines, disk arrays and/or multiple workstations (e.g., desktop computers, workstation servers, laptops, smartphones, etc.) in communication with one another.

In the illustrated example, the media hosting server 102 is in selective communication with the crawler 110 via one or more wired and/or wireless networks represented by network 114. Example network 114 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

The example data collection entity 108 of the illustrated example of FIG. 1 is an entity that accesses, collects and/or catalogs information available across the Internet. In the illustrated example of FIG. 1, the data collection entity 108 is an audience measurement entity that monitors and/or reports the usage of content, advertisements and/or other types of media such as The Nielsen Company (US), LLC. For example, the data collection entity 108 may develop an example reference library 112 using collected and/or cataloged web pages, images, video, audio, content, advertisements and/or other types of media. In other examples, the data collection entity may be a search engine collecting and/or cataloging web pages from across the Internet, an entity searching for a vulnerability (or vulnerabilities) in a web page to report, an entity searching for a vulnerability (or vulnerabilities) in a web page to exploit, an entity collecting email addresses for malicious purposes, or any other entity hosting the crawler 110 for any purpose. As used herein, media is defined to include content and/or advertisements of any type. Internet media is defined to be media accessible via the Internet.

The crawler 110 of the illustrated example is an Internet bot developed to discover and catalog media (e.g., content, advertisements and/or other types of media) available on the Internet. For example, the crawler 110 may identify an example web page 116 and proceed with accessing (e.g., collecting and/or cataloging) the web page 116 and/or components of the web page (e.g., ads in iframes). In the illustrated example, to access the web page 116, the crawler 110 sends a Hypertext Transfer Protocol (HTTP) request (e.g., an HTML GET request, an HTML POST request, etc.) to a web server hosting the web page 116 (e.g., the media hosting server 102). The crawler 110 of the illustrated example then receives returned media from the hosting web server. In the illustrated example, the crawler 110 catalogs and identifies the returned media in the example reference library 112. In some examples, the crawler 110 is implemented as a software program. In some examples, the crawler 110 is embedded in a web browser, in panelist monitoring software and/or in another client-side application to, for example, facilitate collecting media dynamically generated by client-side scripts.

In the illustrated example of FIG. 1, a media provider and/or media hosting entity operates and/or hosts the media hosting server 102 that responds to requests (e.g., HTTP requests) for media (e.g., content and/or advertisements). For example, the media hosting server 102 may host the web page 116 accessed by the crawler 110. In some examples, the media hosting server 102 is operated and/or hosted by a third-party (e.g., an ad serving party).

In the illustrated example of FIG. 1, the crawler 110 accesses the web page 116, which includes a video 118 and an advertisement 119. In the illustrated example, the crawler 110 initiates a first media access session 120 by transmitting a first media request 121 to the media hosting server 102 requesting the web page 116. The crawler 110 may request additional media included in the web page 116 (e.g., the media 118, 119). In some examples, the first media request 121 (e.g., the request for the web page 116) is implemented as an HTTP POST message, an HTTP GET message, or similar message used in present and/or future HTTP protocols (e.g., HTTP Secure (HTTPS)) and/or other protocols. In the illustrated example, the media hosting server 102 processes the first media request 121 by returning the web page 116, the video 118 and the advertisement 119 to the crawler 110. More specifically, the media hosting server 102 of the illustrated example responds to the request by returning the media 116, 118, 119 from the media data store 106. The example media hosting server 102 of the illustrated example then responds to the first media request 121 by serving the requested media 116, 118, 119 in a first media response 122. The example crawler 110 of FIG. 1 then processes the first media response 122 and displays (e.g., presents on a display) the web page 116 including the video 118 and the advertisement 119. Although, in this example, the media 116, 118, 119 is all served from the media hosting server 102, in some examples, some of the media is served from another location. For instance, the advertisement 119 can be hosted by a third-party server. In such an example, the media hosting server 102 returns a link to the ad server (e.g., in an iframe of the web page) to cause the crawler to automatically request the advertisement 119 from the ad server.

In some examples, the media hosting server 102 may receive more than one media request from the crawler 110. For example, the crawler 110 may initiate a second media access session 124 and a third media access session 130 to catalog the web page 116 at different moments. For example, the crawler 110 may initiate media access sessions 120, 124, 130 over the course of one second, one day, one week, etc. In some such examples, the media hosting server 102 may utilize excessive amounts of network resources to serve the requested media to the crawler 110.

To manage the number of media requests processed from the crawler 110, the example media hosting server 102 of FIG. 1 includes the throttling engine 104. The throttling engine 104 parses media requests to locate source-identifying information (e.g., a crawler identifier, a data collection entity identifier, etc.) and uses the source-identifying information to classify the crawler 110. In the illustrated example, the throttling engine 104 classifies a crawler as a partner crawler, a non-partner crawler or an unknown crawler. For example, a partner crawler may be a crawler developed by an audience measurement entity in partnership with a media provider hosting the media hosting server 102. In some such examples, the data collection entity 108 provides source-identifying information to identify their crawler(s) as partner crawler(s). A web crawler developed for malicious purposes or by a data collection entity that does not have a relationship (e.g., a business partnership) with the media provider is classified as a non-partner crawler. The example throttling engine 104 classifies a crawler that initiated a media access session that cannot be classified as a partner or a non-partner as an unknown crawler.

In the illustrated example, the throttling engine 104 uses the source classification information to determine if a penalty (e.g., a delay time period) should be introduced in the corresponding media access session and, if so, how large of a penalty. For example, the throttling engine 104 may introduce a first penalty (e.g., one second) to media access sessions initiated by a partner crawler, a second penalty (longer in duration than the first penalty (e.g., two seconds)) to media access sessions initiated by an unknown crawler, and a third penalty (longer in duration than the first penalty and the second penalty (e.g., three seconds)) to media access sessions initiated by a non-partner crawler. Although examples disclosed herein are described in connection with three source classification groups, disclosed techniques may also be used in connection with any number of categories. Additionally, although in the above example, a penalty is applied to all crawlers, in some examples, one or more classes of crawler (e.g., partner crawlers) are not penalized.

In the illustrated example, the throttling engine 104 applies a penalty by introducing a delay time period 128 in a media access session, thereby increasing the amount of time to complete the media access session (e.g., increasing the time before transmitting the requested media). In some examples, the example throttling engine 104 introduces the delay time period 128 at the server-side. In other examples, the example throttling engine 104 introduces the delay at the client-side. In some examples, the throttling engine 104 introduces a delay at both the server-side and the client-side. To introduce the delay time period 128 at the server-side, the throttling engine 104 of FIG. 1 "pauses" or slows down transmission of the media response message to the crawler 110. To this end, as described above in connection with the example second media access session 124, the example throttling engine 104 may respond to the first media request message 125 by transmitting the first media response message 126, waiting the delay time period 128 and then transmitting the second media response message 127. In some examples, the throttling engine 104 transmits two or more media response messages if, for example, the network resources available to the throttling engine 104 are limited or other reasons. For example, the first media response message 126 may include a first portion (e.g., a first half, a first third, etc.) of the video 118 and the second media response message 127 may include a second portion (e.g., a second half, a second two-thirds, etc.) of the video 118. In other examples, the first media response message 126 and the second media response message 127 may include different media. For example, the first media response message 126 may include the video 118 and the second media response message 127 may include the advertisement 119. Thus, the throttling engine 104 may implement a delay by waiting for the delay time between requests so that the requesting device will delay sending further requests while awaiting the second or subsequent responses.

Additionally or alternatively, the throttling engine 104 may introduce the delay time period 128 at the client-side by embedding executable instructions (e.g., Java, JavaScript, etc.) in the media response message to the crawler 110. In the illustrated example of FIG. 1, the throttling engine 104 embeds an example delay tag 134 in the first media response message 132 of the third media access session 130. In some such examples, executing the delay tag 134 causes the web crawler to, for example, call native "pausing" or delay functions of the web crawler (e.g., a JavaScript setTimeout( ) function), to execute operations that "waste" or "burn" enough processor clock cycles to produce the delay time period 128, to select operations to execute based on the characteristics of the web crawler, to request data for a dummy web site setup for the purpose of generating delays, etc.

Figure 2:
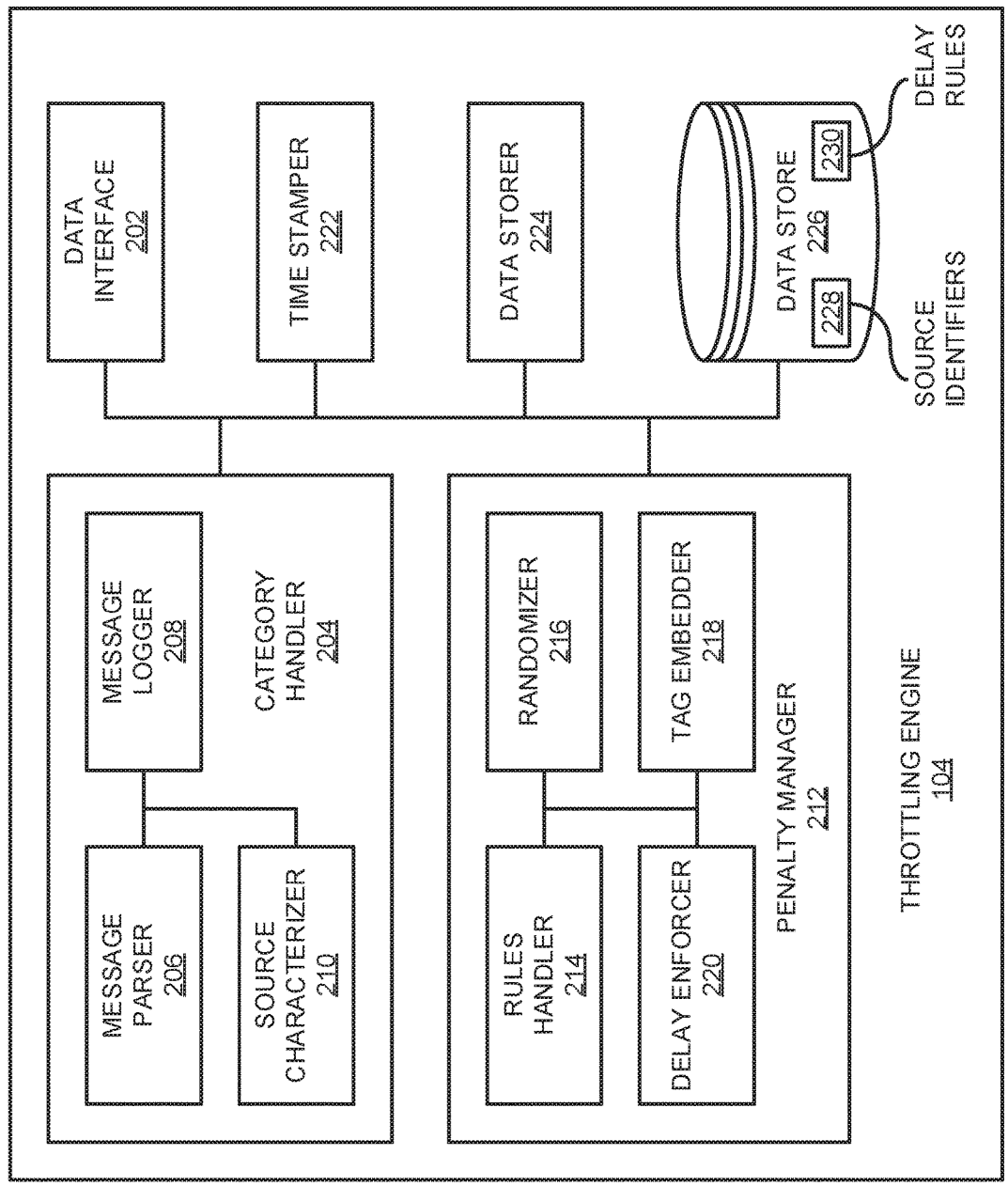
FIG. 2 is a block diagram of an example implementation of the throttling engine of FIG. 1.

FIG. 2 is a block diagram of an example implementation of the throttling engine 104 of FIG. 1. The example throttling engine 104 of FIG. 2 includes an example data interface 202, an example category handler 204, an example penalty manager 212, an example time stamper 222, an example data storer 224 and an example data store 226.

In the illustrated example of FIG. 2, the throttling engine 104 includes the example data interface 202 to enable the throttling engine 104 and the crawler 110 to communicate. For example, the data interface 202 may be implemented by a wireless interface, an Ethernet interface, a cellular interface, etc. In the illustrated example, the data interface 202 receives media request messages (e.g., the example media request messages 121, 125, 131 of FIG. 1) from the crawler 110 and/or transmits media response messages (e.g., the example media response messages 122, 126, 127, 132) to the crawler 110. In some examples, the data interface 202 includes a buffer to temporarily store media request messages as they are received and/or media response messages as they are ready for transmission. In some examples, the buffering-time is controlled to introduce the delay period as discussed above. In other examples, the buffering-time is not part of the time delay penalty enforcement process.

In the illustrated example of FIG. 2, the throttling engine 104 includes the example category handler 204 to categorize media request sources as a partner crawler, a non-partner crawler or an unknown crawler. In the illustrated example of FIG. 2, the category handler 204 includes an example message parser 206, an example message logger 208 and an example source characterizer 210.

In the illustrated example of FIG. 2, the message parser 206 extracts source-identifying information from media request messages. The message parser 206 of this example identifies a unique identifier (e.g., a crawler identifier, a data collection entity identifier, etc.) included in a user agent field of the media request message, included in a GET command of the media request message, and/or an IP address associated with a data collection entity. In some examples, the message parser 206 extracts additional information included in the media request message. For example, the message parser 206 may extract a media identifier identifying the media requested in the media request message. In some examples, the message parser 206 may be unable to identify source-identifying information in a media request message. For example, a media request message received from an unknown crawler may not include source-identifying information.

In the illustrated example of FIG. 2, the message logger 208 records information collected by the category handler 204. The message logger 208 of the illustrated example generates a message entry including a media request message identifier, the source-identifying information and the media identifier extracted by the message parser 206. In some examples, the message logger 208 appends, prepends and/or otherwise associates the message entry with additional information regarding the media request message. For example, the message logger 208 may track the number of media request messages received from each source requesting the media, the number of media request messages received for respective media from each source requesting media and/or the total number of media request messages received for respective media from respective sources requesting media. In some examples, the message logger 208 may append, perpend and/or otherwise associate a label indicating capabilities of the source request media such as whether each source requesting media is able to execute executable instructions included in, referenced by or otherwise associated with the media. For example, the message logger 208 may use a user agent field of the media request message to determine whether the crawler 110 is operating as a web browser (e.g., embedded in an Internet browser) and if the web browser is able to execute Java, JavaScript and/or other executable instructions. In addition, the message logger 208 may append and/or prepend a timestamp from the time stamper 222 indicating the date and/or time when the media request message was received by the throttling engine 104.

In the illustrated example of FIG. 2, the example source characterizer 210 uses the source-identifying information extracted by the message parser 206 to classify the source requesting media (e.g., the crawler 110) as partner-affiliated, non-partner affiliated or unknown. In the illustrated example, the source characterizer 210 uses a data structure (e.g., a lookup table, etc.) to classify the source requesting the media. For example, the source characterizer 210 of FIG. 2 compares the source-identifying information extracted by the message parser 206 to source identifiers included in an example table of source identifiers 228 stored in the data store 226. However, other methods to classify each source requesting media may additionally or alternatively be used. In some examples, the source characterizer 210 may append, prepend and/or otherwise associate the source category to the corresponding message entry logged by the example message logger 208.

In some examples, the table of source identifiers 228 operates as a blacklist. In some such examples, when the source-identifying information extracted from a media request message is included in the table of source identifiers 228, the source characterizer 210 appends, prepends and/or otherwise associates the corresponding message entry with a label indicating that the crawler 110 is non-partner affiliated. In some examples, the table of source identifiers 228 operates as a whitelist. In some such examples, when the source-identifying information extracted from the media request message is included in the table of source identifiers 228, the source characterizer 210 appends, prepends and/or otherwise associates the corresponding message entry with a label indicating that the crawler 110 is partner-affiliated.

In some examples, the message parser 206 does not provide source-identifying information. In some such examples when no source-identifying information is provided or the source-identifying information is not included in the table of source identifiers 228, the source characterizer 210 attributes the missing source-identifying information to a media request message received from an unknown source. Accordingly, the source characterizer 210 may append, prepend and/or otherwise associates the corresponding message entry with a label indicating that the crawler 110 is an unknown crawler.

In the illustrated example of FIG. 2, the throttling engine 104 includes the example penalty manager 212 to introduce the delay in a media access session based on the crawler classification determined by the category handler 204. In the illustrated example, the penalty manager 212 includes an example rules handler 214, an example randomizer 216, an example tag embedder 218 and an example delay enforcer 220.

The example rules handler 214 of the illustrated example determines a delay time period to introduce in the media access session. In some examples, the source characterizer 210 uses a data structure (e.g., a lookup table, etc.) to determine the delay time period. In the illustrated example, the rules handler 214 uses an example lookup table of delay rules 230 stored in the data store 226 to determine the delay time period. For example, the rules handler 214 of the illustrated example compares the source category to rules included in the table of delay rules 230 stored in the data store 226. However, other methods to determine the delay time period to introduce may additionally or alternatively be used.

In some examples, the penalties for a source classification are determined based on the number of media access sessions initiated by the crawler. For example, a non-partner affiliated crawler may be subject to a first penalty (e.g., two seconds) when the number of media access sessions initiated by the crawler is less than one hundred, may be subject to a second penalty (e.g., four seconds) larger than the first penalty when the number of media access sessions initiated by the crawler is between one hundred and one thousand, and may be subject to a third penalty (e.g., six seconds) longer than the first and second penalties when the number of media access sessions initiated by the crawler is greater than one thousand sessions.

In media sessions in which more than one media response messages are sent, the example randomizer 216 of FIG. 2 determines which of the media response message(s) are to include a delay. In some examples, the randomizer 216 distributes the penalty determined by the rules handler 214 across two or more portions of media. For example, in the second media access session 124 of FIG. 1, the media hosting server 102 responds to the first media request message 125 of the second media access session 124 by sending two media response messages 126, 127. In the illustrated example, the randomizer 216 applies the delay time period 128 to the second media response message 127 of the second media access session 124. In this example, the penalty distribution is 0% and 100%. In this example, the time duration between the media hosting server 102 sending the first media response message 126 and the second media response message 127 of the second media access session 124 is the delay time period 128. In some instances, the randomizer 216 may determine that the penalty is to be applied to the first media response message 126 and not to the second media response message 127, may determine that the penalty is to be distributed between both the first and the second response messages 126, 127 of the second media access session 124 such that each of the first and the second response messages 126, 127 exhibit some non-zero percentage of the time delay 128. The selection between the above instances can be achieved using, for example, a pseudo-random number generator normalized between zero and one and selecting an option based on the pseudo-random number.

In the illustrated example, the randomizer 216 also determines whether to initiate the tag embedder 218 to enforce a client-side delay in the media access session and/or whether to initiate the delay enforcer 220 to enforce a server-side delay in the media access session. In some examples, the randomizer 216 uses the log generated by the message logger 208 to first determine whether the crawler 110 is able to execute instructions (e.g., scripts, code, etc.), and uses that information to distribute the penalty in a manner suitable to the abilities of the crawler's software and/or hardware.

In the illustrated example of FIG. 2, when the delay enforcer 220 is initiated by the randomizer 216, the delay enforcer 220 enforces a server-side delay in the media access session. The example delay enforcer 220 of this example enforces the server-side delay by extending the time used by the media hosting server 102 when retrieving media and/or transmitting media response messages. For example, the delay enforcer 220 of FIG. 2 enforces the penalty on the second media response message 127 of the second media access session 124 of FIG. 1 by causing the media hosting server 102 to respond to the first media request message 125 of the second media access session 124 by delaying transmission of the second media response message 127 by the delay time period 128. In other examples, the delay enforcer 220 may enforce the penalty on the first media response message 126 by causing the media hosting server 102 to wait the delay time period 128 and then serving the first and second media response messages 126, 127 of the second media access session 124. In some other examples, the delay enforcer 220 enforces the penalty to both media response messages 126, 127 of the second media access session 124 by causing the media hosting server 102 to wait a portion of (e.g., one-half) the delay time period 128 before serving the first media response message 126 and to wait another portion (e.g., one-half) of the delay time period 128 delay before serving the second media response message 127 of the second media access session 124. However, other combinations of delay techniques to enforce a penalty (e.g., introduce a "pause") at the server-side may additionally or alternatively be used.

In some examples, the delay enforcer 220 executes executable instructions (e.g., a JavaScript function) to implement the delay time period. For example, the delay enforcer 220 may execute a delay (seed) function. In some such examples, the delay enforcer 220 may access a table of delay time periods in which each delay time period maps to a corresponding seed value. The example delay enforcer 220 may then select the seed value that maps to the delay time period 128 and execute the delay (seed) function using the selected seed value. In some such examples, the delay (seed) function takes a known period of time to complete, and executing the delay (seed) function with different seed values can be used to implement the delay time period.

In the illustrated example of FIG. 2, when the example tag embedder 218 is initiated by the example randomizer 216, the example tag embedder 218 embeds executable instructions in the media to cause a delay at the crawler 110 before the crawler 110 presents the requested media. For example, in the third media access session 130, the tag embedder 218 embeds the delay tag 134 in the first media response message 132. In the illustrated example, execution (e.g., processing) of the delay tag 134 causes the crawler 110 to delay presenting the media by the delay time period 128.

In some examples, the tag embedder 218 selects operations to include in the delay tag 134 that cause the crawler 110 to call native "pausing" or delaying functions of the crawler 110 (e.g., executing an instruction that pauses execution such as the setTimeout( ) function in JavaScript). In some examples, the tag embedder 218 may vary the operations included in the delay tag 134 based on a determination of the crawler 110. For example, the crawler 110 may be known to include an interpreter (e.g., a JavaScript interpreter) that is unable to execute and/or ignores (e.g., intentionally ignores) executing native "pausing" functions of the crawler 110. In some examples, the tag embedder 218 may select operations to include in the delay tag 134 that cause the crawler 110 to "waste" or "burn" enough processor clock cycles to produce the delay time period 128. For example, the tag embedder 218 may insert a processing intensive function or a function that otherwise takes a period of time to execute (e.g., a JavaScript process that includes functionality that causes the executing device to await a particular time before proceeding (e.g., var d=new Date( ); var c=d.getTime( ); while (d.getTime( )<(c+millsecondsToWait) {doNothingUseful( );})) for the crawler 110 to execute. Because processors vary from device to device, the amount of time delayed by the delay tag 134 may vary from device to device. Alternatively, the tag embedder 218 may structure the delay tag 134 to terminate the operations of the delay tag 134 after the delay time period has elapsed during execution and/or may be configured to detect characteristics of the crawler 110 and/or the hardware and (and/or virtual machine) executing the crawler (e.g., process type, speed, etc.) and adjust the number of operations accordingly. Additionally or alternatively, the tag embedder 218 may calibrate a delay by measuring how long it takes the crawler 110 to execute code. For example, the instructions included in the delay tag 134 may be a hash function to calculate a key or hash that the crawler 110 needs provide with the request for the media from the media hosting server 102.

In some examples, instead of embedding delay tags on the fly, the example tag embedder 218 may choose between pre-existing copies of the media associated with different delay time periods. For example, a first copy of the media may include no tag, a second copy of the media may include a first tag associated with a first delay, a third copy of the media may include a second tag associated with a second delay, etc.

In the illustrated example of FIG. 2, the example time stamper 222 includes a clock and a calendar. The example time stamper 222 associates a time period (e.g., 1:00:01 a.m. Central Standard Time (CST) to 1:01:05 a.m. (CST) and a date (e.g., Jan. 1, 2014) with media request identifying information generated by the message logger 208 by, for example, appending, prepending and/or otherwise associating the period of time and the date information with the data.

The example data storer 224 of FIG. 2 stores source-identifying information received from the message parser 206, the source classifications received from the source characterizer 210 and/or delay information received from the penalty manager 212.

The example data store 226 of the illustrated example of FIG. 2 may be implemented by any storage device and/or storage disc for storing data such as, for example, flash memory, magnetic media, optical media, etc. Furthermore, the data stored in the data store 226 may be in any data format such as, for example, binary data, comma delimited data, tab delimited data, structured query language (SQL) structures, etc. While in the illustrated example the data store 226 is illustrated as a single database, the data store 226 may be implemented by any number and/or type(s) of databases.

While an example manner of implementing the throttling engine 104 of FIG. 1 is illustrated in FIG. 2, one or more of the elements, processes and/or devices illustrated in FIG. 2 may be combined, divided, re-arranged, omitted, eliminated and/or implemented in any other way. Further, the example data interface 202, the example category handler 204, the example message parser 206, the example message logger 208, the example source characterizer 210, the example penalty manager 212, the example rules handler 214, the example randomizer 216, the example tag embedder 218, the example delay enforcer 220, the example time stamper 222, the example data storer 224, the example data store 226 and/or, more generally, the example throttling engine 104 of FIG. 2 may be implemented by hardware, software, firmware and/or any combination of hardware, software and/or firmware. Thus, for example, any of the example data interface 202, the example category handler 204, the example message parser 206, the example message logger 208, the example source characterizer 210, the example penalty manager 212, the example rules handler 214, the example randomizer 216, the example tag embedder 218, the example delay enforcer 220, the example time stamper 222, the example data storer 224, the example data store 226 and/or, more generally, the example throttling engine 104 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 202, the example category handler 204, the example message parser 206, the example message logger 208, the example source characterizer 210, the example penalty manager 212, the example rules handler 214, the example randomizer 216, the example tag embedder 218, the example delay enforcer 220, the example time stamper 222, the example data storer 224 and/or the example data store 226 is/are hereby expressly defined to include a tangible computer readable storage device or storage disk such as a memory, a digital versatile disk (DVD), a compact disk (CD), a Blu-ray disk, etc. storing the software and/or firmware. Further still, the example throttling engine 104 of FIG. 1 may include one or more elements, processes and/or devices in addition to, or instead of, those illustrated in FIG. 2, and/or may include more than one of any or all of the illustrated elements, processes and devices.

Figure 3:
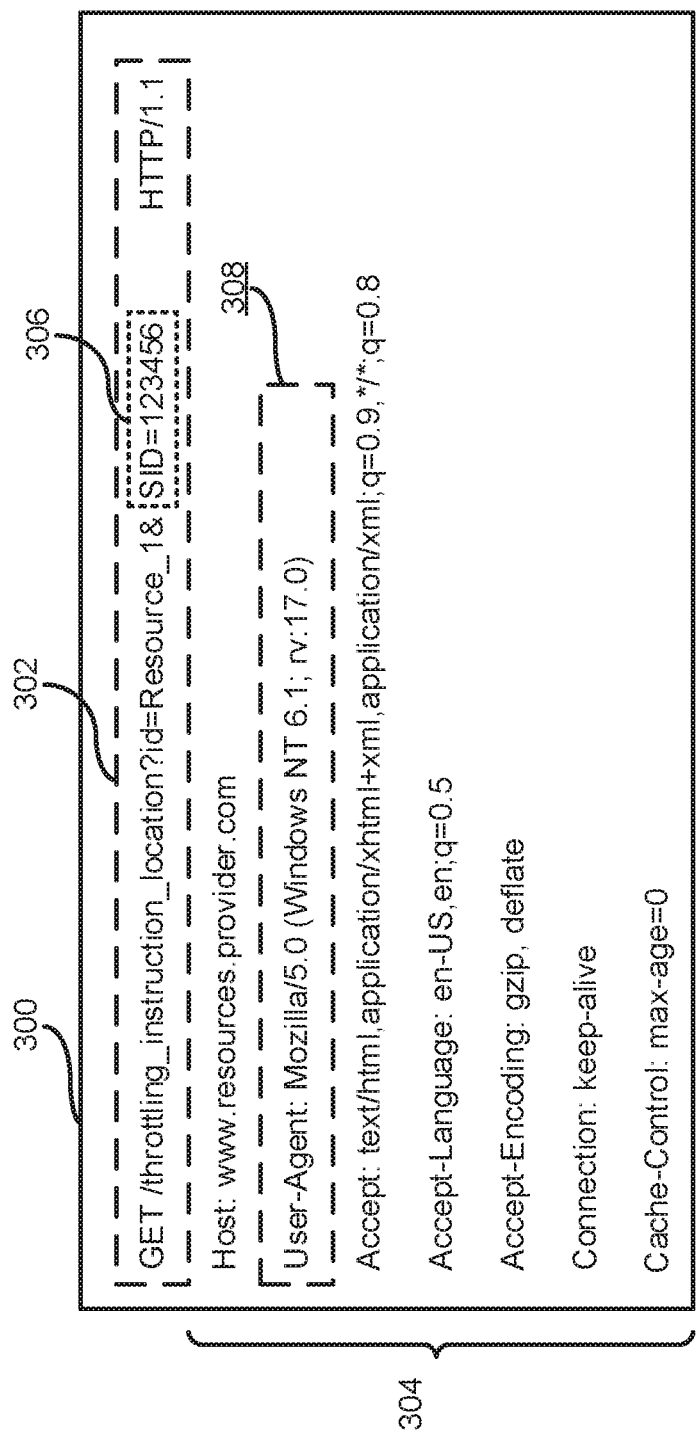
FIG. 3 is an example Hypertext Transfer Protocol request message that may be used to initiate media access sessions with the throttling engine of FIGS. 1 and/or 2.

FIG. 3 illustrates an example media request message 300 that has been sent by a crawler initiating a media access session. In the illustrated example of FIG. 3, the media request message 300 includes an example media request line 302 and example headers 304. In the illustrated example, the media request line 302 indicates that the media request message 300 is an HTTP GET request. However, other HTTP requests such as an HTTP POST request and/or an HTTP HEAD request and/or requests from other protocols may additionally and/or alternatively be utilized. In the illustrated example of FIG. 3, the example media request line 302 includes a request for media (e.g., /throttling_instruction_location?id=Resource_1&SID=123456) from the server (e.g., www.resources.provider.com). As described above in connection with the example environment 100 of FIG. 1, the media request message 300 is a request for media (e.g., Resource_1) from the media hosting server 102. In addition, the media request message 300 includes source-identifying information 306 (e.g., 123456) associated with the crawler and/or the data collection entity that operates and/or hosts the crawler. The example source-identifying information 306 may be any unique or semi-unique identifier that is associated with a data collection entity and/or a crawler. For example, the source-identifying information 306 may be a crawler identifier, a data collection entity generated identifier, a media access control (MAC) address, an Internet protocol address, etc.

In the illustrated example of FIG. 3, the headers 304 include an example user agent 308. The example user agent 308 identifies characteristics of the crawler. In the illustrated example of FIG. 3, the user agent 308 indicates that the media request message 300 is sent via a Mozilla version 5.0 browser.

Figure 4:
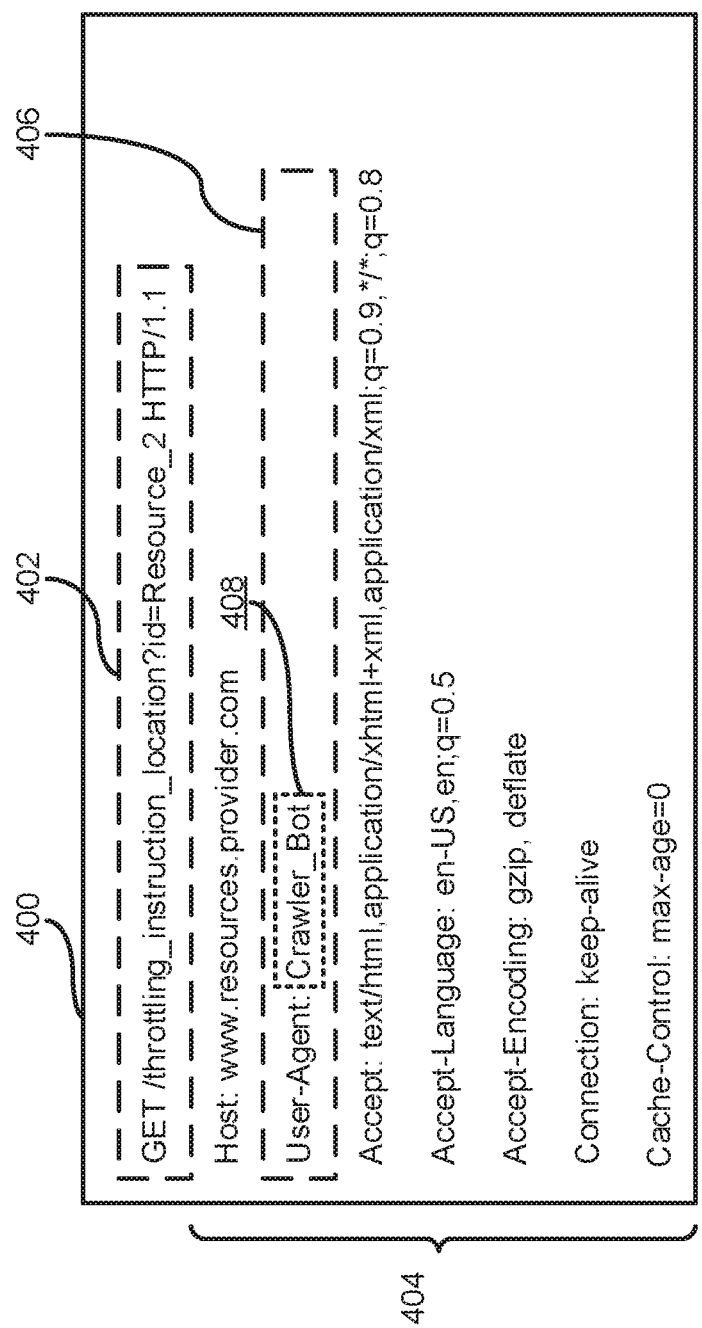
FIG. 4 is another example Hypertext Transfer Protocol request message that may be used to initiate media access sessions with the throttling engine of FIGS. 1 and/or 2.

FIG. 4 illustrates another example media request message 400 that has been sent by a crawler initiating a media access session. In the illustrated example of FIG. 4, the media request message 400 includes an example media request line 402 and example headers 404. In the illustrated example, the media request line 402 indicates that the media request message 400 is an HTTP GET request. However, other HTTP requests such as an HTTP POST request and/or an HTTP HEAD request are also possible. In the illustrated example of FIG. 4, the example media request line 402 includes a request for media (e.g., /throttling_instruction_location?id=Resource_2) from the server (e.g., www.resources.provider.com). As described above in connection with the example environment 100 of FIG. 1, the media request message 400 is a request for media (e.g., Resource_2) from the example media hosting server 102.

In the illustrated example of FIG. 4, the headers 404 include an example user agent 406. The example user agent 406 identifies characteristics of the example crawler 110. In the illustrated example of FIG. 4, the user agent 406 includes example source-identifying information 408 identifying the crawler that generated the request. The example source-identifying information 408 may be any unique system identifier that is associated with a data collection entity and/or a crawler. For example, the source identifier 306 may be a crawler identifier, a data collection entity generated identifier, a media access control (MAC) address, an Internet protocol address, etc. In the illustrated example, the source-identifying information 408 is a crawler identifier (e.g., Crawler_Bot).

Figure 5:
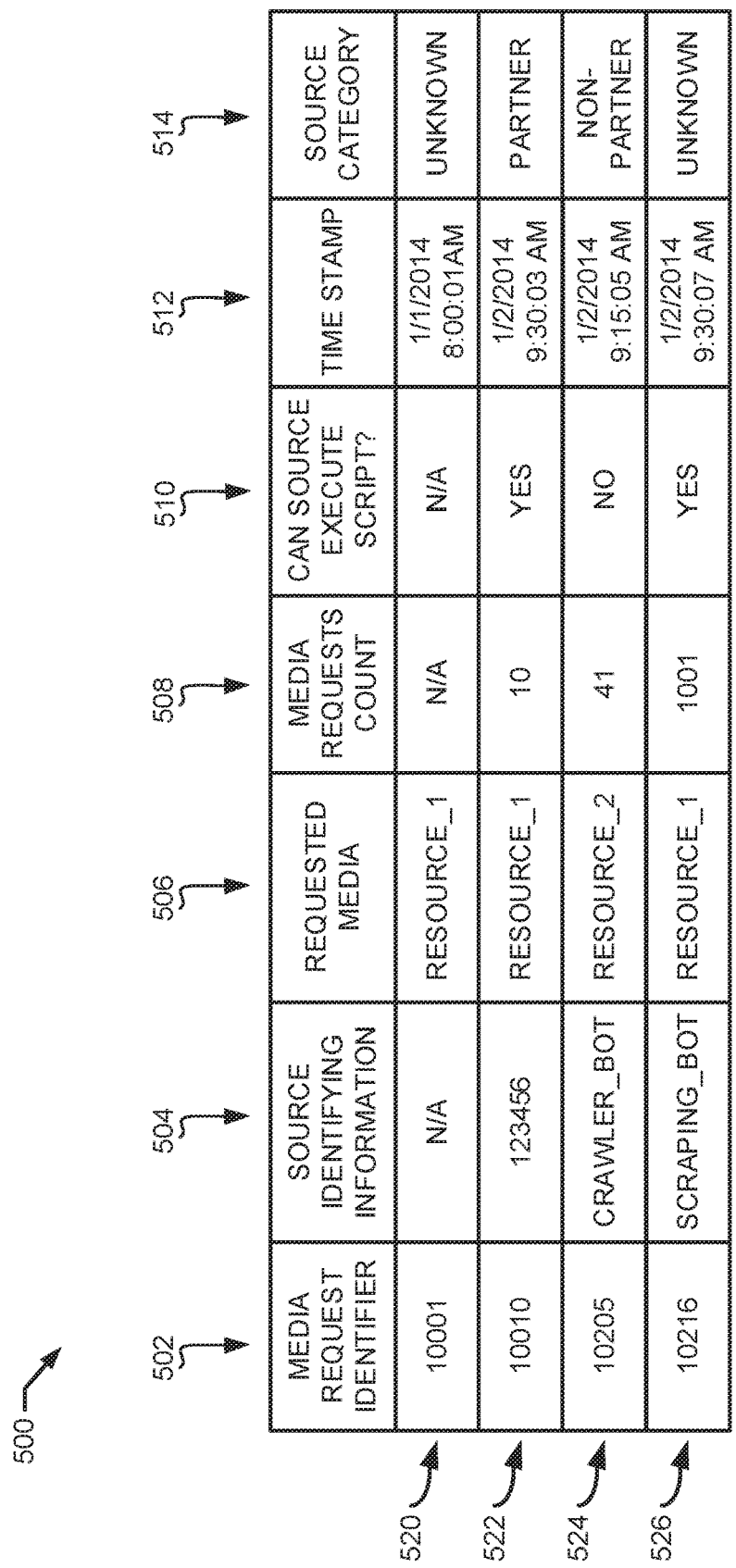
FIG. 5 is an example data table listing information about media request messages obtained by the throttling engine of FIGS. 1 and/or 2.

FIG. 5 illustrates an example data table 500 representing message entry information that may be stored by the example throttling engine 104 in the example data store 226 of FIG. 2 to log media access sessions. The example data table 500 includes a media request identifier field 502, a source-identifying information field 504, a requested media identifier field 506, a media requests count field 508, a field indicating whether or not a source can execute a script 510, a field indicating a time stamp of the request 512, and a field indicating a source category of the request 518. In some examples, the data table 500 includes additional and/or alternative message entry information such as a data collection facility identifier, an IP address, etc. In the illustrated example, the throttling engine 104 extracts source-identifying information from received media request messages when available. For example, example row 522 corresponds with a media request message identified by media request identifier "10010," which indicates that a crawler with the source identifier "123456" requested media "Resource_1" at 9:30:03 AM on Jan. 1, 2014. In addition, row 522 indicates that the source-identifying information (e.g., "123456") is associated with a partner entity and, thus, categorized as a "partner." In addition, to-date, ten media requests for "Resource_1" have originated from the crawler associated with the source-identifying information "123456." The example data table 500 also indicates that, in row 522, the crawler associated with the source-identifying information "123456" is able to execute a script.

In the illustrated example of FIG. 5, row 520 corresponds with the media request message "10001." The example row 520 indicates that the throttling engine 104 was unable to extract source-identifying from the corresponding media request message.

In the illustrated example of FIG. 5, row 524 corresponds with the media request message identified by media request identifier "10205." The example row 524 indicates that a crawler associated with the source-identifying information "crawler_bot" requested media "Resource_2" at 9:15:05 AM on Jan. 2, 2014 and that the crawler has requested the media "Resource_2" forty-one times. Example row 524 also indicates that the throttling engine 104 labeled the crawler associated with the source-identifying information "crawler_bot" as a "non-partner source" and that the crawler with the source identifier "crawler_bot" is unable to execute scripts.

In the illustrated example of FIG. 5, row 526 corresponds with the media request message identified by media request identifier "10216." The example row 526 indicates that a crawler associated with the source-identifying information "scraping_bot" requested media "Resource_1" at 9:30:07 AM on Jan. 2, 2014, and that the crawler requested the media "Resource_1" 1001 times. Example row 526 also indicates that the throttling engine 104 labeled the crawler associated with the source identifier "scraping_bot" as an "unknown source" and that the crawler is able to execute scripts.

FIG. 6 is an example table of delay rules 600 that may be stored by the example throttling engine 104 of FIGS. 1 and/or 2 to instruct the throttling engine 104 on how to determine a delay time period to introduce in a media access session based on the source category of the corresponding crawler. In some examples, the throttling engine 104 introduces the delay at the server-side. In other examples, the throttling engine 104 introduces the delay at the client-side. In the illustrated example of FIG. 6, the table of delay rules 600 associates a source category 602 and a penalty threshold field 604 with a delay time period 606. In the illustrated example of FIG. 6, rows 612, 614, 616, 618 indicate the penalty for partner-affiliated crawlers 610, rows 622, 624, 626 indicate the penalty for non-partner affiliated crawlers 620, and rows 632, 634 indicate the penalty for unknown crawlers 630.

In some examples, the penalty threshold field 604 is directed to the frequency of media request messages received from a crawler. For example, rows 612, 614, 632 and 634 are directed to a number of media request messages received in one second. Row 612 indicates that no penalty is introduced in a media access session when a partner-affiliated crawler executes less than five media request messages per second. While partner-affiliated crawlers may not be developed for nefarious purposes, the partner-affiliated crawlers may still exhibit behavior similar to non-partner affiliated crawlers and, thus, the number of media request messages made by the partner-affiliated crawlers may be throttled. For example, a partner-affiliated crawler may be hijacked by a non-partner and may modify the behavior of the partner-affiliated crawler. In the illustrated example, the table of delay rules 600 includes non-zero delay time periods for partner-affiliated crawlers. Row 614 indicates that a one second penalty is introduced to media access sessions initiated by a crawler that is partner-affiliated and executes five or more media request messages per second.

In some examples, the penalty threshold field 604 is directed to controlling the number (e.g., an aggregate number, a total number, etc.) of media request messages received from a crawler. In some such examples, the number of media requests may be reset (e.g., set to zero) every one hour from the last received request, etc. In some examples, the time period may be a sliding window (e.g., the number of media requests received during the past hour). In the illustrated example of FIG. 6, row 616 indicates that no (e.g., zero) delay time period is introduced in a media access session initiated by a partner-affiliated crawler that executes less than one hundred media request messages within a time period (e.g., less than one hundred media request messages in one hour, etc.). However, in the illustrated example, row 618 indicates that a one second penalty is introduced in a media access session initiated by a partner-affiliated crawler when the partner-affiliated crawler executes one hundred or more total media request messages within a time period (e.g., one hundred or more media request messages in one hour, etc.).

Example rows 622, 624 and 626 indicate the penalty to apply (e.g., the delay to introduce) to a non-partner affiliated crawler that satisfies corresponding penalty threshold fields 604. In the illustrated example, the table of delay rules 600 indicates penalties for crawlers classified as unknown sources. By including penalties for unknown crawlers, the throttling engine 104 is able to account for, for example, new malicious crawlers (e.g., row 634) and/or for new partner-affiliated crawlers that may not have had their source-identifying information added to the example table of source identifiers 228 of FIG. 2.

Figure 7:
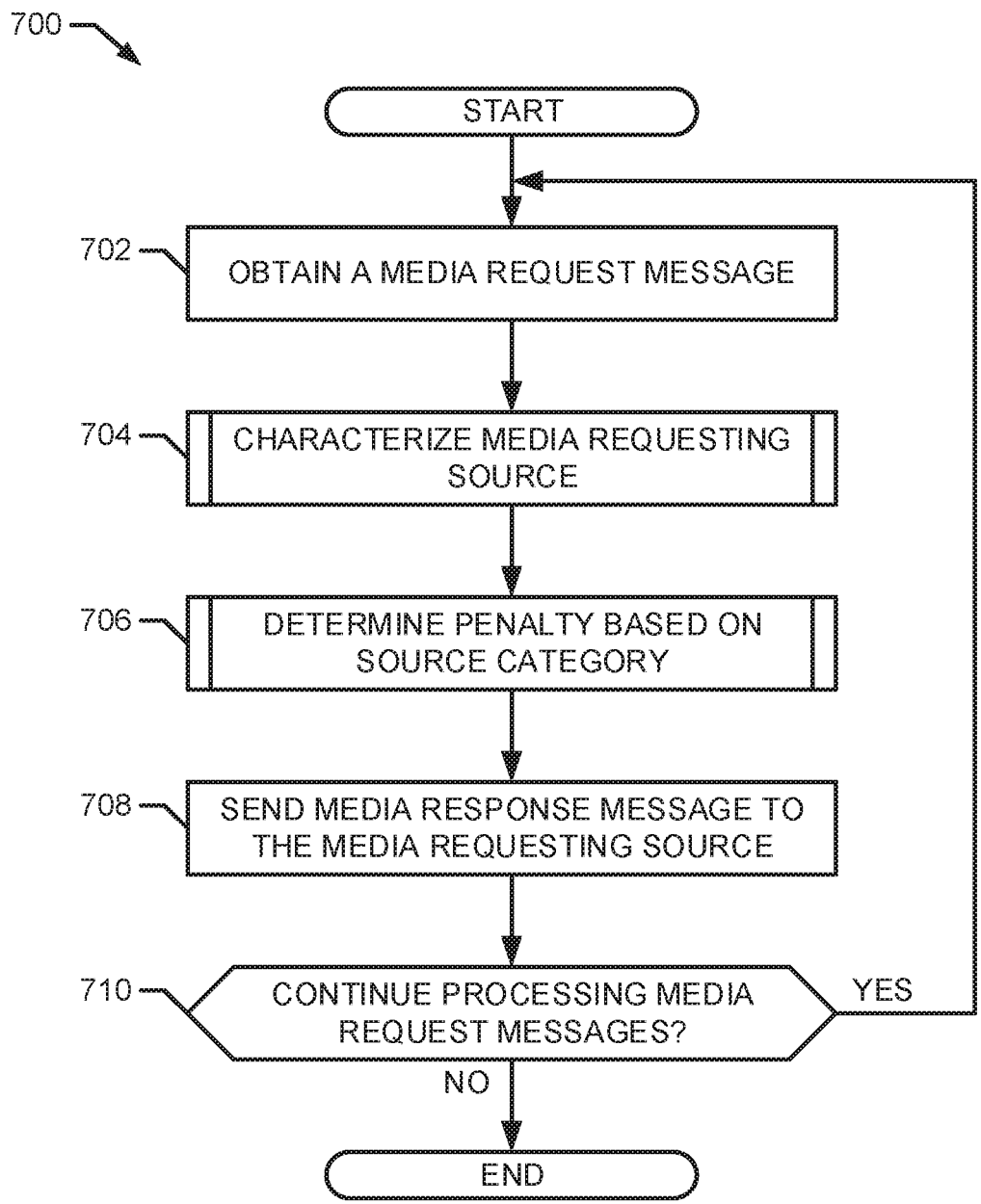
FIGS. 7-9 are flowcharts representative of example machine readable instructions that may be executed to throttle media access by web crawlers in accordance with the teachings of this disclosure.
Figure 8:
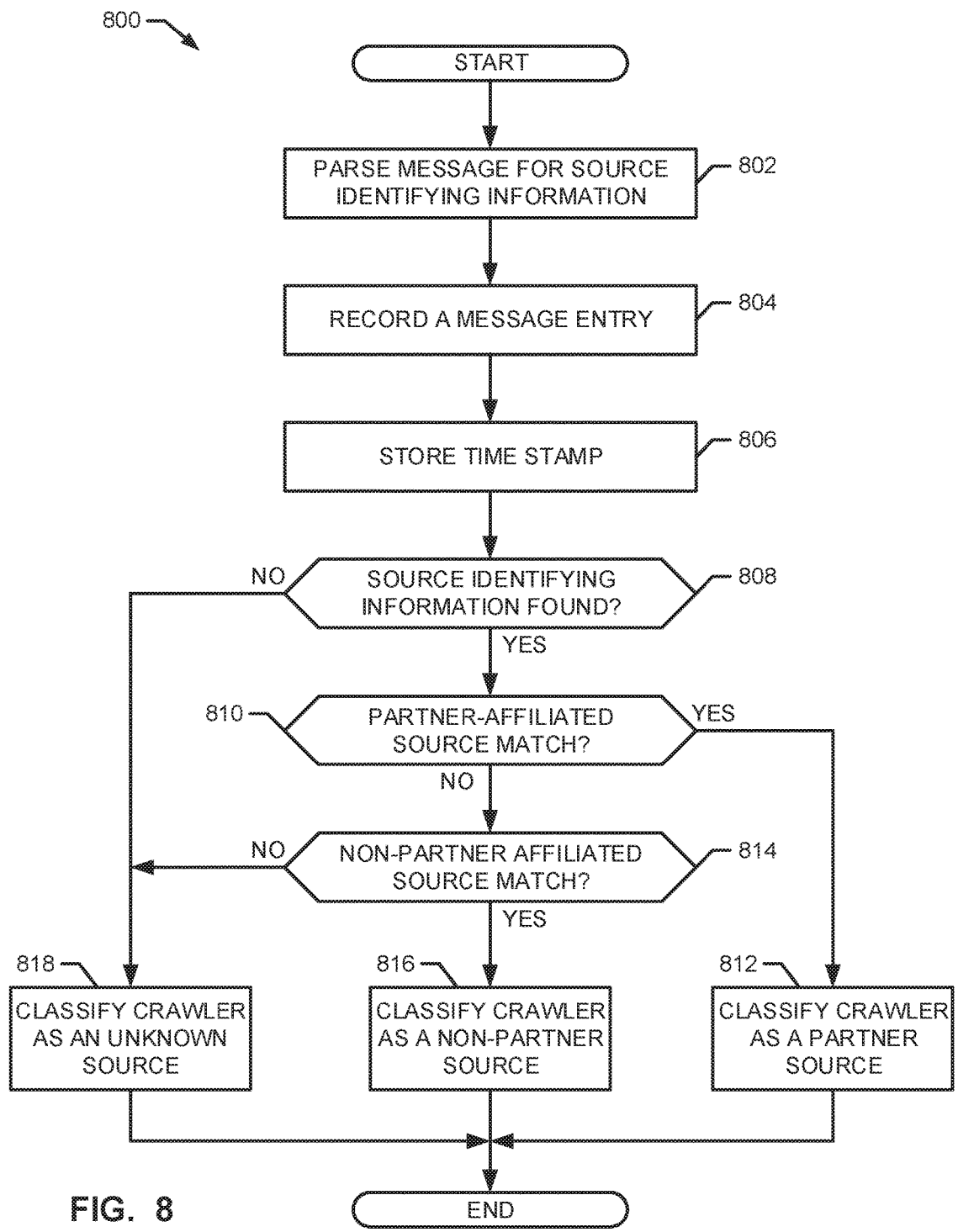
Figure 9:
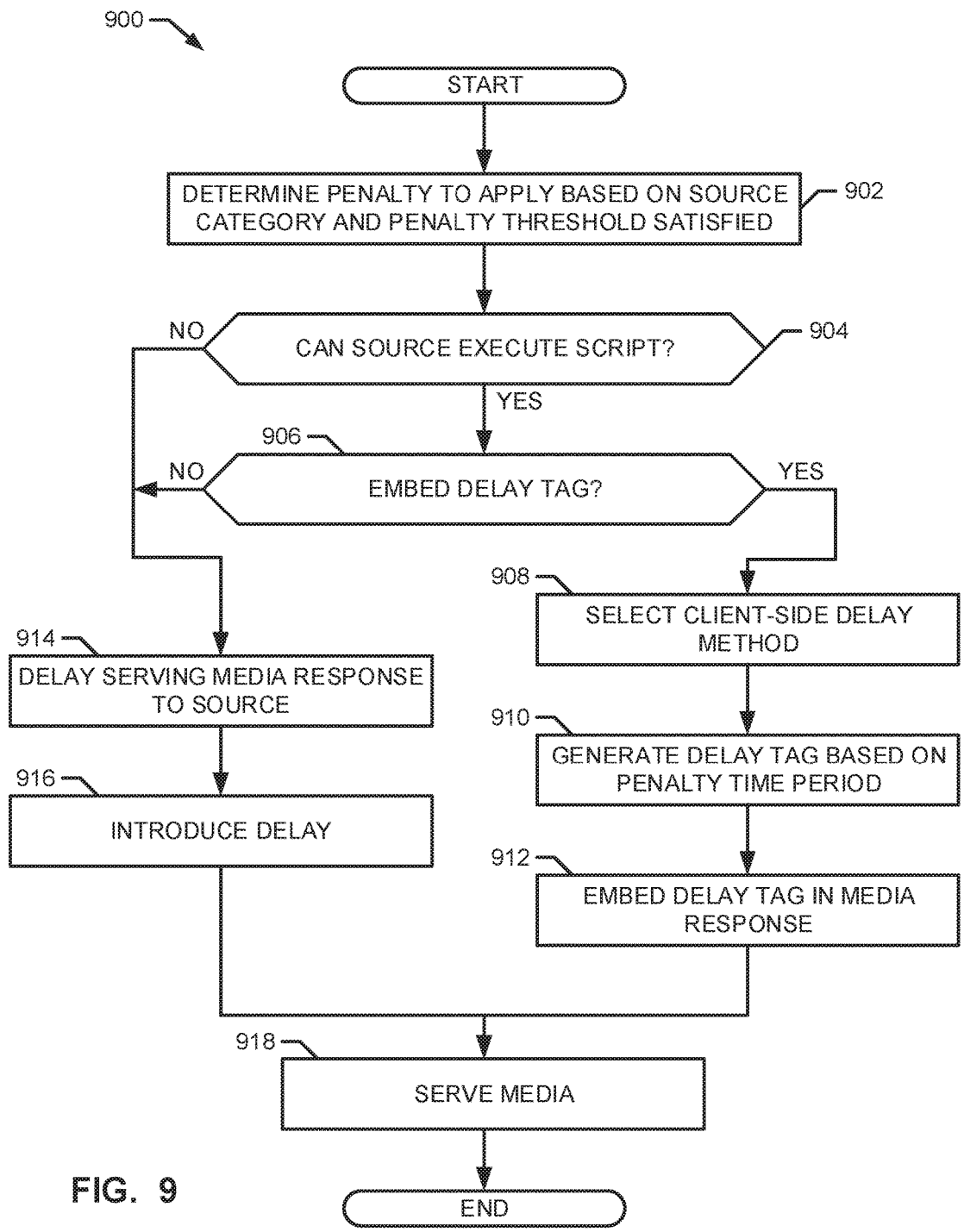

Flowcharts representative of example machine readable instructions for implementing the throttling engine 104 of FIGS. 1 and 2 are shown in FIG. 7-9. In these examples, the machine readable instructions comprise a program for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire programs and/or parts thereof could alternatively be executed by a device other than the processor 1012 and/or embodied in firmware or dedicated hardware. Further, although the example program is described with reference to the flowchart illustrated in FIG. 7-9, many other methods of implementing the example throttling engine 104 of FIGS. 1 and 2 may alternatively be used. For example, the order of execution of the blocks may be changed, and/or some of the blocks described may be changed, eliminated, or combined.

As mentioned above, the example processes of FIGS. 7-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program 700 of FIG. 7 begins at block 702 when the example throttling engine 104 (FIGS. 1 and 2) obtains a media request message. For example, the crawler 110 (FIG. 1) initiates a media access session by sending the media request message. The data interface 202 (FIG. 2) receives the media request message from the crawler 110. At block 704, the throttling engine 104 determines the source of the media request message. For example, the category handler 204 (FIG. 2) may classify the crawler 110 as a partner-affiliated crawler, a non-partner affiliated crawler or an unknown crawler (or any other categories that are available). In the illustrated example, the operation of block 704 may be implemented using the process described in conjunction with FIG. 8. At block 706, the throttling engine 104 determines the penalty to introduce in the media access session. For example, the penalty manager 212 may delay sending a media response message to the crawler 110 (server-side delay), may embed the delay tag 134 in a media response message to the crawler 110 (client-side delay) or introduce no penalty in the media access session. In the illustrated example, the operation of block 706 may be implemented using the process described in conjunction with FIG. 9.

At block 708, the example throttling engine 104 sends a media response message to the source requesting media. For example, the data interface 202 may transmit a media response message to the crawler 110 in response to the media request message. In some examples, the throttling engine 104 embeds the delay tag 134 in the media response message to cause the crawler 110 to execute the executable instructions included in the delay tag 134 and, thus, delay completion of the media access session. At block 710, the example throttling engine 104 determines whether to continue processing media requests. For example, the throttling engine 104 may check if the throttling engine 104 is receiving media requests and/or if there are any unprocessed media request messages (e.g., media request messages stored in a buffered by the data interface 202). If, at block 710, the throttling engine 104 determined that processing of media request messages is to continue, control returns to block 702 to obtain the next media request message. If, at block 710, the throttling engine 104 determined that processing of media request messages is not to continue, the example process 700 of FIG. 7 ends.

The example program 800 of FIG. 8 facilitates the throttling engine 104 (FIGS. 1 and 2) classifying the source of the media request message (e.g., the crawler 110 of FIG. 1). The example program 800 may be used to implement block 704 of FIG. 7. At block 802, the throttling engine 104 parses the media request message for source-identifying information. For example, the message parser 206 (FIG. 2) may extract a crawler identifier, a data collection entity identifier, etc. from the media request message. At block 804, the throttling engine 104 records a message entry based on information provided by the message parser 206. For example, the message logger 208 may generate a row in the example data table 500 and populate the media request identifier field 502, the source-identifying information field 504, the requested media field 506, the number of media requests count 508 and label the crawler 110 as able to execute script or not able to execute script. At block 806, the example throttling engine 104 stores the time stamp provided by the time stamper 222 (FIG. 2) in the time stamp field 512 of the corresponding entry.

At block 808, the throttling engine 104 determines whether the message parser 206 extracted source-identifying information from the media request message. If, at block 808, the message parser 206 did not extract source-identifying information from the media request message, control proceeds to block 818 to classify the crawler 110 as an unknown source.

If, at block 808, the message parser 206 did extract source-identifying information from the media request message, then, at block 810, the throttling engine 104 determines whether the source-identifying information matches a partner-affiliated source. For example, the source characterizer 210 (FIG. 2) may compare the source-identifying information to source category identifiers included in the example table of source identifiers 228. If, at block 810, the source characterizer 210 found a match with a partner-affiliated source, then, at block 812, the throttling engine 104 classifies the crawler 110 as a partner source. For example, the source characterizer 210 may append, prepend and/or otherwise associate the partner source label to the corresponding message entry in the example data table 500. The example process 800 of FIG. 8 then ends.

If, at block 810, the example throttling engine 104 did not find a match with a partner-affiliated source, then, at block 814, the throttling engine 104 determines whether the source-identifying information matches a non-partner affiliated source. For example, the source characterizer 210 may compare the source-identifying information to source category identifiers included in the example table of source identifiers 228. If, at block 814, the source characterizer 210 found a match with a non-partner affiliated source, then, at block 816, the throttling engine 104 classifies the crawler 110 as a non-partner source. For example, the source characterizer 210 may append, prepend and/or otherwise associate the non-partner source label to the corresponding message entry in the data table 500. The example process 800 of FIG. 8 then ends.

If, at block 814, the example throttling engine 104 did not match the source-identifying information to a non-partner affiliated source, or after the throttling engine 104 did not identify source-identifying information from the media request message at block 808, then, at block 818, the throttling engine 104 classifies the crawler as an unknown source. For example, the source characterizer 210 may append, prepend and/or otherwise associate the unknown source label to the corresponding message entry in the example data table 500. The example process 800 of FIG. 8 then ends.

The example program 900 of FIG. 9 facilitates the throttling engine 104 (FIGS. 1 and 2) introducing a penalty in media access sessions initiated by the crawler 110 (FIG. 1). The example program 900 may be used to implement block 706 of FIG. 7. At block 902, the throttling engine 104 determines a penalty to introduce in the media access session based on the source category associated with the determined sender of the media request message (e.g., the example crawler 110 of FIG. 1). For example, the rules handler 214 (FIG. 2) may parse the example table of delay rules 230 and match the source category with the penalty threshold field 604. For example, the rules handler 214 may compare the number of media request messages received from the corresponding source to the penalty threshold fields 604 indicated in the table of delay rules 230. In some examples, the rules handler 214 may check the frequency of media request messages received from the crawler 110 to the penalty threshold fields 604 in the table of delay rules 230. For example, the rules handler 214 may check the number of media request messages received from the crawler 110 in a one second time period.

At block 904, the example throttling engine 104 determines whether the crawler 110 can execute a script. For example, the penalty manager 212 (FIG. 2) may reference the data table 500 to determine whether the example crawler 110 can execute a script. If, at block 904, the throttling engine 104 determined that the crawler 110 can execute a script, then, at block 906, the throttling engine 104 determines whether to introduce the penalty in the media access session by embedding the example delay tag 134. For example, the randomizer 216 (FIG. 2) may randomly determine (e.g., via a random number generator) whether to apply the penalty at the client-side (e.g., embed the delay tag 134) or introduce the penalty at the server-side (e.g., via a "pause" or delay in serving the media response message).

If, at block 906, the example throttling engine 104 determined to embed the delay tag 134, then, at block 908, the throttling engine 104 selects a method to introduce the delay at the client-side. For example, the tag embedder 218 may select operations to include in the delay tag 134 that cause the crawler 110 to call native "pausing" functions of the crawler 110 (e.g., executing an instruction that pauses execution such as the setTimeout( ) function in JavaScript). Alternatively, the tag embedder 218 may vary the operations included in the delay tag 134 based on a determination of the crawler 110. For example, the crawler 110 may be known to include an interpreter (e.g., a JavaScript interpreter) that is unable to execute and/or ignores (e.g., intentionally ignores) executing native "pausing" functions of the crawler 110. In some examples, the tag embedder 218 may select operations to include in the delay tag 134 that cause the crawler 110 to "waste" or "burn" enough processor clock cycles to produce the delay time period 128. For example, the tag embedder 218 may insert a processing intensive function (e.g., a JavaScript getTime( ) function) for the crawler 110 to execute. Additionally or alternatively, the delay tag 134 may be structured to terminate the operations of the delay tag 134 after the delay time period has elapsed during execution and/or may be configured to detect characteristics of the crawler 110 and/or the hardware and (and/or virtual machine) executing the crawler (e.g., process type, speed, etc.) and adjust the number of operations accordingly. In some examples, the tag embedder 218 may calibrate a delay by measuring how long it takes the crawler 110 to execute code. For example, the instructions included in the delay tag 134 may be a hash function to calculate a key or hash that the crawler 110 needs to provide in association with a further request for media from the media hosting server 102. In such examples, requiring the key or hash be provided in a further request ensures that the requesting device (e.g., the crawler) performs the time consuming hash function (e.g., ensures that the requesting device does not simply ignore the instructions for performing the hash function).

At block 910, the throttling engine 104 generates the delay tag 134 to embed in the media response message. For example, the example tag embedder 218 may generate, based on the selected method to introduce the delay, a script using executable instructions, the execution of which results in extending the time required to complete the media access session. At block 912, the throttling engine 104 embeds the delay tag 134 in the first media response message 132 of the third media access session 130, and control proceeds to block 918 to serve the media response to the crawler 110.

If, at block 904, the throttling engine 104 determined that the crawler 110 cannot execute a script, or, if, at block 906, the throttling engine 104 determined not to embed the delay tag 134, then, at block 914, the throttling engine 104 selects a method to introduce the delay at the server-side. For example, the delay enforcer 220 (FIG. 2) may identify a seed value for insertion in an example delay function (e.g., a delay(seed) function), the execution of which, using the seed value, results in the delay time period elapsing. In some examples, the delay enforcer 220 may select to wait for the delay time period to elapse prior to retrieving and/or transmitting the requested media.

At block 916, the throttling engine 104 introduces the delay before transmitting the media response message to the crawler 110. For example, the example delay enforcer 220 may cause the media hosting server 102 to execute the delay function using the identified seed value prior to retrieving the requested media and/or to pause prior to transmitting the requested media to the crawler 110. In some examples, the delay enforcer 220 may wait prior to retrieving the requested media and/or to pause prior to transmitting the requested media to the crawler 110.

After the example tag embedder 218 embedded the delay tag 134 in the media response message at block 912 or after the example delay enforcer 220 introduced the delay server-side at block 916, then, at block 918, the throttling engine 104 serves the requested media to the crawler 110 to process. The example process 900 of FIG. 9 then ends.

In some examples, the media request message received by the throttling engine 104 may cause more than one portion of media to be transmitted to the crawler 110. In some such examples, the throttling engine 104 may distribute the penalty randomly across the portions of media. For example, in the example second media access session 124 of FIG. 1, the example throttling engine 104 delays for the example delay time period 128 before transmitting the second media response message 127 after transmitting the first media response message 126.

Figure 10:
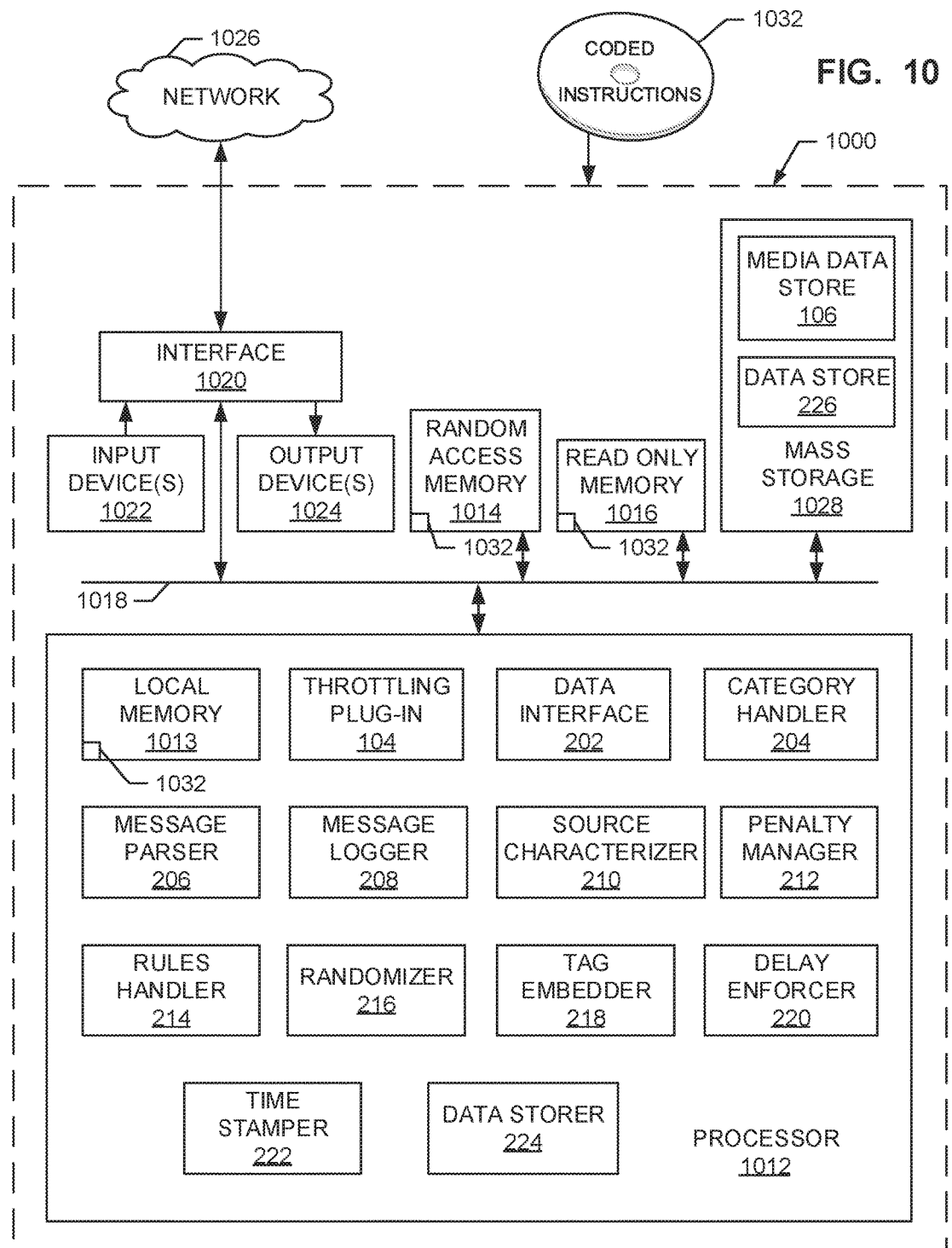
FIG. 10 is a block diagram of an example processing platform capable of executing the example machine readable instructions of FIGS. 7-9 to implement the example throttling engine of FIGS. 1 and/or 2.

FIG. 10 is a block diagram of an example processor platform 1000 structured to execute the instructions of FIGS. 7-9 to implement the throttling engine 104 of FIGS. 1 and 2. The processor platform 1000 can be, for example a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 of the illustrated example executes the instructions to implement the example data interface 202, the example category handler 204, the example message parser 206, the example message logger 208, the example source characterizer 210, the example penalty manager 212, the example rules handler 214, the example randomizer 216, the example tag embedder 218, the example delay enforcer 220, the example time stamper 222 and the example data storer 224. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. In the illustrated example, the mass storage device 1028 implements the media data store 106 and the data store 226. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 7-9 may be stored in the mass storage device 1028, in the volatile memory 1014, in the non-volatile memory 1016, and/or on a removable tangible computer readable storage medium such as a CD or DVD.

From the foregoing, it will be appreciated that methods, apparatus and articles of manufacture have been disclosed to throttle media access requests received at a server such as a media hosting server. Examples disclosed herein advantageously control network resources used by a web crawler by throttling the number of media requests that the web crawlers is able to execute during a time period. For example, examples disclosed herein introduce a delay in a media access session, thereby decreasing the number of subsequent media access sessions the web crawler is able to execute. By introducing a delay in the media access session, the time to complete one media access session increases and the web crawler is able to initiate fewer media access sessions than it could execute in the absence of the delay.

Examples disclosed herein recognize that it may be beneficial to receive media access requests from certain crawlers. Accordingly, when a media access session is initiated, unlike robot exclusion standard files, which apply an "all-or-nothing" system, examples disclosed herein identify the source of the media request message and vary the delay time periods based on category (or categories) and/or classification(s) of the source. For example, a web crawler associated with an audience measurement entity may be characterized as a partner crawler and a spambot may be characterized as a malicious crawler. Accordingly, examples disclosed herein enable providing varying penalties (e.g., delay time periods) to different web crawlers. Such delays can range from milliseconds to seconds, to minutes, to hours, to days or even complete blocking of requests for some classifications.

In some examples, web crawlers may try to "cheat" the system by attempting to identify which media responses are penalized (e.g., which responses are delayed in arriving at the web crawler and/or which responses increase the time period between receiving a media response message and presenting the corresponding media). To prevent web crawlers from "cheating" the system, examples disclosed herein randomize the media response messages that are penalized. Furthermore, examples disclosed herein may randomize how a penalty is distributed to the requested media. For example, examples disclosed herein may distribute a penalty across media (e.g., a web page including a video and an advertisement), for example, by transmitting two or more media response messages where each media response message includes a different portion of the media and a portion of the delay. For example, examples disclosed herein may distribute a one second penalty across the requested media by, for example, causing a one second delay for a first media response message including the video portion of the web page and no delay for a second media response message including the advertisement portion of the web page, causing no delay for the first media response message including the video portion of the web page and a one second delay for the second media response message including the advertisement portion of the web page, causing a one-half second delay for the first media response message including the video portion of the web page and a one-half second delay for the second media response message including the advertisement portion of the web page, etc.

Examples disclosed herein may implement the delay server-side and/or client-side. When implementing the delay at the server-side, examples disclosed herein "pause" or slow down transmission of a media response message in response to a media request message received from the web crawler. Additionally or alternatively, examples disclosed herein may apply the delay at the client-side by embedding a delay tag in the media response message. Examples disclosed herein may structure the delay tag to call native "pausing" functions of the web crawler, to execute operations that "waste" or "burn" enough processor clock cycles to produce the delay time period, to select operations to execute based on the characteristics of the web crawler, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a data interface to obtain a media request message for media hosted by a server, the media request message requesting access to the media;
a category handler to determine a source indicator of a media-requesting source associated with the media request message, the source indicator indicating whether the media-requesting source is associated with a media provider to provide audience measurement information associated with the media provided by the media provider; and
a penalty manager to insert a time delay including a delay tag in the media response message to the media-requesting source based on the source indicator, the delay tag to cause a delay time period based on the source indicator, at least one of the data interface, category handler, and penalty manager is implemented on a logic circuit.

2. The apparatus as defined in claim 1, wherein the media-requesting source is a web crawler.

3. The apparatus as defined in claim 1, wherein the delay tag includes executable instructions.

4. The apparatus as defined in claim 3, wherein the executable instructions include a native delay function.

5. The apparatus as defined in claim 1, wherein execution of the delay tag generates the time delay.

6. The apparatus as defined in claim 1, wherein execution of the delay tag requests data from a web site associated with generating the time delay.

7. The apparatus as defined in claim 1, wherein the penalty manager is to insert the time delay in the media response message by selecting a pre-existing copy of the media with a delay tag associated with the time delay.

8. The apparatus as defined in claim 1, wherein the media request message is either a hypertext transfer protocol GET request or a hypertext transfer protocol POST request.

9. An apparatus to throttle media access at a server, the method comprising:

means for obtaining, at the server, a media request message for media hosted by the server, the media request message requesting access to the media;

means for determining a source indicator of a media-requesting source, the source indicator indicating whether the media-requesting source is associated with a media provider to provide audience measurement information associated with the media provided by the media provider; and means for inserting a time delay including a delay tag in the media response message to the media-requesting source based on the source indicator, the delay tag to cause a delay time period.

10. The apparatus as defined in claim 9, wherein the media-requesting source is a web crawler.

11. The apparatus as defined in claim 9, wherein the delay tag includes executable instructions.

12. The apparatus as defined in claim 11, wherein the executable instructions include a native delay function.

13. The apparatus as defined in claim 9, wherein executing the delay tag generates the time delay.

14. The apparatus as defined in claim 9, wherein executing the delay tag causes the media-requesting source to request data from a web site associated with generating the time delay.

15. The apparatus as defined in claim 9, wherein inserting the time delay in the media response message comprises selecting a pre-existing copy of the media with a delay tag associated with the time delay.

16. The apparatus as defined in claim 9, wherein the media request message is either a hypertext transfer protocol GET request or a hypertext transfer protocol POST request.

17. A non-transitory tangible computer readable storage medium comprising instructions that, when executed, cause a server hosting media to at least:

obtain a media request message for media hosted by the server, the media request message requesting access to the media;

determine a source indicator of a media-requesting source, the source indicator indicating whether the media-requesting source is associated with a media provider to provide audience measurement information associated with the media provided by the media provider; and insert a time delay including a delay tag in the media response message to the media-requesting source based on the characterization, the delay tag to cause a delay time period based on the source indicator.

18. The computer readable storage medium as defined in claim 17, wherein executing the delay tag causes the media-requesting source to request data from a web site associated with generating the time delay.

19. The computer readable storage medium as defined in claim 17, wherein the instructions further cause the server to insert the time delay in the media response message by selecting a pre-existing copy of the media with a delay tag associated with the time delay.

20. The computer readable storage medium as defined in claim 17, wherein the media request message is either a hypertext transfer protocol GET request or a hypertext transfer protocol POST request.

* * * * *

UNITED STATES PATENT AND TRADEMARK OFFICE
CERTIFICATE OF CORRECTION

PATENT NO. : 10,257,113 B2  
APPLICATION NO. : 15/889173  
DATED : April 9, 2019  
INVENTOR(S) : Bradley R. Lawrence, III Page 1 of 1

It is certified that error appears in the above-identified patent and that said Letters Patent is hereby corrected as shown below:

In the Claims

Column 22, Line 42 (Claim 1), replace "the media response message" with --a media response message--

Column 22, Line 67 (Claim 9), replace "method" with --apparatus--

Column 23, Line 11 (Claim 9), replace "the media response message" with --a media response message--

Column 24, Line 13 (Claim 17), replace "the media" with --a media--

Column 24, Line 15 (Claim 17), replace "the characterization" with --a characterization--

Signed and Sealed this  
Twenty-fifth Day of April, 2023

Katherine Kelly Vidal  
*Director of the United States Patent and Trademark Office*